(12) United States Patent
Henke et al.

(10) Patent No.: US 8,116,070 B2
(45) Date of Patent: Feb. 14, 2012

(54) CONTROL AND SWITCHGEAR CABINET

(75) Inventors: Ralf Henke, Brühl (DE); Sven Wehrmann, Hilden (DE)

(73) Assignee: ABB Technology AG, Zurich (CH)

( * ) Notice: Subject to any disclaimer, the term of this patent is extended or adjusted under 35 U.S.C. 154(b) by 316 days.

(21) Appl. No.: 12/394,812

(22) Filed: Feb. 27, 2009

(65) Prior Publication Data

US 2009/0206714 A1 Aug. 20, 2009

Related U.S. Application Data

(63) Continuation of application No. PCT/EP2007/007579, filed on Aug. 30, 2007.

(30) Foreign Application Priority Data

Sep. 2, 2006 (DE) .......................... 10 2006 041 234

(51) Int. Cl.
*H02B 7/00* (2006.01)
(52) U.S. Cl. ........................................ 361/605; 361/622
(58) Field of Classification Search .................. 361/605, 361/614, 616, 622
See application file for complete search history.

(56) References Cited

U.S. PATENT DOCUMENTS

| | | | | |
|---|---|---|---|---|
| 2,130,250 A | * | 9/1938 | Reed | 361/610 |
| 2,467,828 A | * | 4/1949 | Hodgkins et al. | 361/828 |
| 4,747,061 A | * | 5/1988 | Lagree et al. | 700/298 |
| 5,124,881 A | * | 6/1992 | Motoki | 361/605 |
| 5,185,705 A | * | 2/1993 | Farrington | 700/292 |
| 5,867,364 A | * | 2/1999 | Roberson | 361/610 |
| 6,275,386 B1 | * | 8/2001 | Jakob et al. | 361/752 |
| 6,445,585 B1 | * | 9/2002 | Walker | 361/724 |
| D553,097 S | * | 10/2007 | Lemke et al. | D13/162 |
| 7,275,947 B2 | | 10/2007 | Hartel et al. | |
| 2006/0044766 A1 | | 3/2006 | Hartel et al. | |

FOREIGN PATENT DOCUMENTS

| | | |
|---|---|---|
| DE | 2824023 | 12/1979 |
| DE | 3624654 A1 | 1/1988 |
| DE | 3927835 A1 | 2/1991 |
| DE | 10 2004 007 260 A1 | 10/2004 |
| DE | 10 2004 0100689 A | 12/2004 |
| DE | 10 2006 041 234 B4 | 7/2008 |
| WO | WO 91/03089 A1 | 3/1991 |
| WO | WO 2004/077907 A1 | 9/2004 |

OTHER PUBLICATIONS

International Search Report for PCT/EP2007/007579 completed Dec. 18, 2007.
International Preliminary Report on Patentability (Form PCT/IB/373), Written Opinion of the International Search Authority (Form PCT/ISA/237) issued in corresponding International Patent Application No. PCT/EP2007/007579, Mar. 17, 2009, The International Bureau of WIPO, Geneva, CH.

* cited by examiner

*Primary Examiner* — Gregory Thompson
(74) *Attorney, Agent, or Firm* — Buchanan Ingersoll & Rooney PC

(57) ABSTRACT

The disclosure relates to a control and switchgear for a medium or high-voltage substation. In order to improve a generic control and switchgear by means of a given number of prefabricated wiring elements, the function-related wiring is combined in a uniform control device which is incorporated into a segment of the switchgear door and is provided with the operator panel on the outside and a series of interfaces on the inside.

6 Claims, 1 Drawing Sheet

CONTROL AND SWITCHGEAR CABINET

RELATED APPLICATIONS

This application claims priority under 35 U.S.C. §119 to German Application No. DE 10 2006 041 234.6 filed in Germany on Sep. 2, 2006, and as a continuation application under 35 U.S.C. §120 to PCT/EP2007/007579 filed as an International Application on Aug. 30, 2007 designating the U.S., the entire contents of which are hereby incorporated by reference in their entireties.

TECHNICAL FIELD

The disclosure relates to a control and switchgear cabinet for a medium-voltage or high-voltage switchgear assembly.

BACKGROUND INFORMATION

A control and switchgear cabinet such as this contains small switching devices, switching contactors, thyristors etc, which in turn operate the switching devices and drives of medium-voltage and high-voltage switchgear assemblies. A control and switchgear cabinet such as this is also referred to as a switchpanel in medium-voltage switchgear assembly technology. This means that, whenever possible, each switchpanel is assigned one such control and switchgear cabinet. Feedback indications, that is to say if appropriate also alarm state signaling devices, are also placed on the control elements of a switchgear cabinet such as this, as well as push-button switches or locking switches.

Until now, when designing a conventional control system, all the required components have had to be installed and wired up individually in the switchpanel door. In the case of a so-called double-busbar installation, these are up to 18 switching devices. The design complied with VDE 0670 part 600-1000 and various other standards such as VDE 0100. The disadvantages of this previous procedure resulting from this are high design, assembly, wiring and documentation complexity implications. Furthermore, this results in the risk of possible wiring errors, since this wiring is not manufactured uniformly.

The operation and configuration of the alarm signals in this known procedure is inflexible. Changes can be implemented only by replacement of existing hardware. No monitoring or watchdog function exists in the known embodiment. The wide range of variants resulting from this because of individual solutions is virtually infinite.

SUMMARY

Exemplary embodiments disclosed herein are directed to a control and switchgear cabinet of this generic type so as to avoid the stated disadvantages, and such that, otherwise, a maximum range of individual functional solutions can be achieved with a minimal complexity level and a given number of wiring elements which can be prefabricated.

A control and switchgear cabinet for a medium-voltage or high-voltage switchgear assembly is disclosed, wherein the functionally-related wiring is physically combined in a uniform controller which is installed in a cutout in the switchpanel door and the control panel has a series of interfaces on the outside and on the inside.

In another aspect, a method of arranging a control and switchgear cabinet is disclosed for a medium-voltage or high-voltage switchgear assembly. Such a method comprises installing a uniform controller in a cutout in a switchpanel door; physically combining functionally-related wiring in a uniform controller installed in a cutout in the switchpanel door; and providing a series of interfaces on at least one of outside and inside of the control panel.

BRIEF DESCRIPTION OF THE DRAWINGS

The disclosure is illustrated in the drawing and will be described in more detail in the following text.

DETAILED DESCRIPTION

Figure 1:
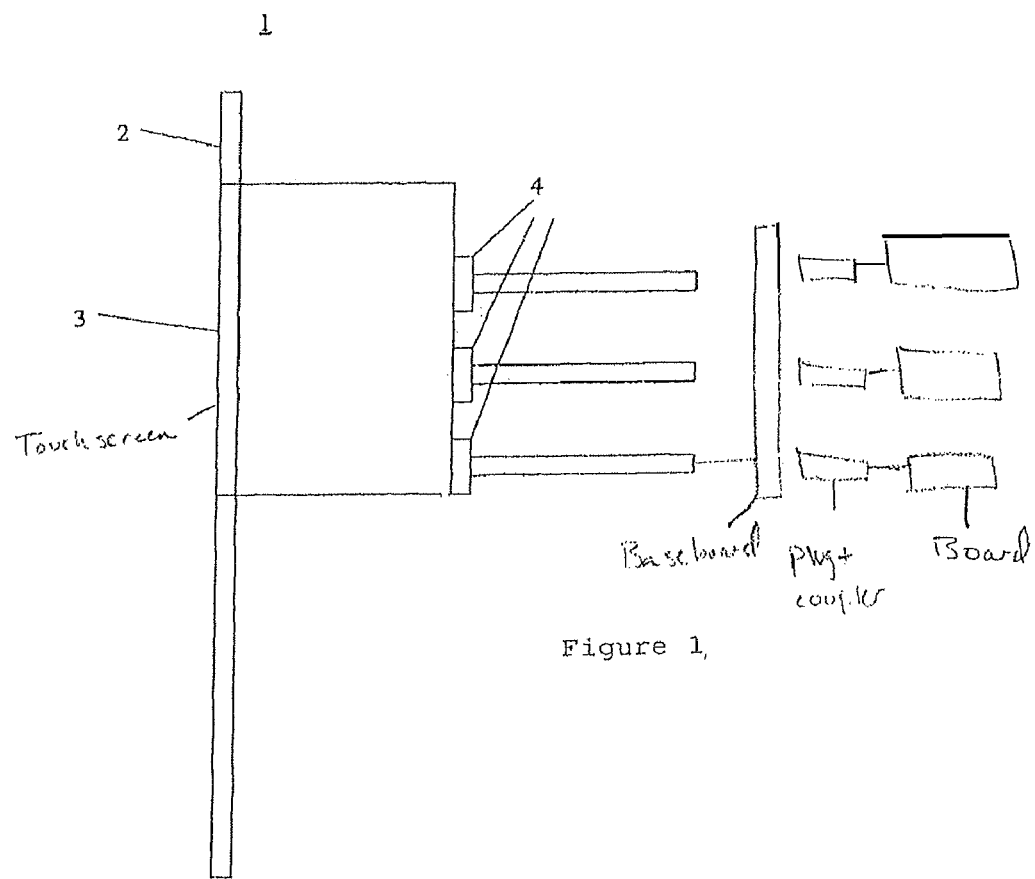
FIG. 1 shows, schematically, an exemplary combined control system for the switchgear cabinet.

According to the example cited initially, the disclosure makes it possible to provide all 18 switching devices 8 in one housing, and with a minimal amount of assembly effort, in large-scale production.

In one exemplary embodiment, the functionally-related wiring is physically combined in a uniform controller which is installed in a cutout in the switchpanel door and the control panel has a series of interfaces on the outside and on the inside.

This controller makes the normal wiring in the switchpanel door obsolete. The interfaces are directly connected to electrical plug connections for the individual switching devices 8 in the switchpanel.

The controller can thus be manufactured uniformly, which is an enormous advantage in large-scale production. The advantage in this case lies not only in manufacturing optimization on its own but also in the high constant, and therefore reproducible, quality which can be achieved in this way.

In another exemplary embodiment, each interface of the controller is connected to its own electronics board 15, with the elongated interface plugs 9 and/or interface plug couplings 10 running at right angles to the switchpanel door into the switchgear cabinet interior, and with the respective electronics cards associated with the interfaces being inserted vertically into the switching device.

This leads to a very compact configuration of a maximum number of functionally related interfaces, with the vertical arrangement of the electronics cards achieving an optimum cooling circulating flow therefore.

This means that, for assembly, the control and switchgear cabinet can first of all be produced uniformly. However, the otherwise complex internal wiring is then reduced considerably. The fitter can then produce the functional application simply with the controller according to the disclosure, which has not yet been installed, on an assembly table. After this, the controller according to the disclosure is just inserted into the switchgear cabinet and the flat cables are connected to the plug strips of the interfaces. The last cables which are still required can be used as prefabricated cable harnesses. The respective customer-specific function is implemented by moving dip switches on the electronics cards.

In another exemplary embodiment, a baseboard 6 is installed parallel to the front panel and holds the contact holders 7 of the switches on the one side and of the internal wiring to the interface-related electronics cards on the other side.

In yet another exemplary embodiment, a plurality of openings 12 are arranged on a regular and fixed grid size in the baseboard 6.

In yet another exemplary embodiment, the front panel is in the form of a functionally programmable touchscreen panel 11 on the outside, that is to say control side. In this embodiment, the normal push-button switches are at least partially replaced by programmable key areas which can be placed as required on the touchscreen 11. This has the advantage that, with a uniform configuration of the switchgear and control cabinet first of all, the final switching functions and configurations of the switchpanel with respect to the switching elements are freely programmable, and can be matched freely to the respective customer application, by subsequent programming.

Only one door cutout therefore can be used. Because of the intelligent modularity, only six variants are now required to implement all the individual solutions. As already mentioned, the wiring is produced using a standardized cable harness. All the connections are provided via plug connections. The space required in the door is reduced to about one third of that of the current solution. The alarm signals are individually freely configurable for the respective application. In the event of device failure, a system signal is generated and is provided for external visualization. Configured test algorithms allow the indication elements to be checked at any time.

In known devices, all the cables and cable harnesses are distributed in cable runs behind the switchgear cabinet door or switchpanel door, because the individual switching devices 8 and switching contactors are arranged distributed on the surface of the door.

In the case of the switching device according to the disclosure, these individual switching elements are all combined in one switching device. On the outside, this then has interfaces 4 for connection of the cable runs as exemplified in FIG. 1. All the individual controllers, switching contactors, relays etc are located within this controller. There is no wiring whatsoever on the inside of the switchgear cabinet door or switchpanel door 2.

The controller 1 is installed in a switchpanel door 2 contains a cutout through which the control panel 3 can be seen, and is arranged such that it can be operated.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A control and switchgear cabinet for a medium-voltage or high-voltage switchgear assembly, wherein:
    functionally-related wiring is physically combined in a uniform controller which is installed in a cutout in a switchpanel door and a control panel has a series of interfaces on an outside and on an inside,
wherein each interface of the controller is connected to its own electronics board, with elongated interface plugs and/or interface plug couplings running at right angles to the switchpanel door into a switchgear cabinet interior, and with the respective electronics boards associated with the interfaces being inserted vertically into the switching device.

2. The control and switchgear cabinet as claimed in claim 1, wherein:
    a baseboard is installed parallel to a front panel and holds contact holders of switches on one side and of internal wiring to the electronics boards on an other side.

3. The control and switchgear cabinet as claimed in claim 2, wherein:
    a plurality of openings are arranged on a regular and fixed grid size in the baseboard.

4. The control and switchgear cabinet as claimed in claim 1, wherein
    a front panel is in the form of a functionally programmable touchscreen panel on an outside which is configured to be a control side.

5. A method of arranging a control and switchgear cabinet for a medium-voltage or high-voltage switchgear assembly, the method comprising:
    installing a uniform controller in a cutout in a switchpanel door;
    physically combining functionally-related wiring in the uniform controller installed in the cutout in the switchpanel door; and
    providing a series of interfaces on at least one of outside and inside of a control panel.

6. The method as claimed in claim 5, wherein the series of interfaces is provided on the outside and the inside of the control panel.

* * * * *